(12) United States Patent
Archambault et al.

(10) Patent No.: US 7,765,534 B2
(45) Date of Patent: Jul. 27, 2010

(54) COMPILER WITH CACHE UTILIZATION OPTIMIZATIONS

(75) Inventors: Roch G. Archambault, North York (CA); Robert J. Blainey, Newmarket (CA); Yaoqing Gao, North York (CA)

(73) Assignee: International Business Machines Corporation, Armonk, NY (US)

( * ) Notice: Subject to any disclaimer, the term of this patent is extended or adjusted under 35 U.S.C. 154(b) by 1689 days.

(21) Appl. No.: 10/835,756

(22) Filed: Apr. 30, 2004

(65) Prior Publication Data

US 2005/0246700 A1    Nov. 3, 2005

(51) Int. Cl.
G06F 9/45    (2006.01)

(52) U.S. Cl. .............. 717/154; 717/144; 717/150; 717/157

(58) Field of Classification Search .......... None
See application file for complete search history.

(56) References Cited

U.S. PATENT DOCUMENTS

| | | | |
|---|---|---|---|
| 4,888,689 A | | 12/1989 | Taylor et al. |
| 5,133,061 A | | 7/1992 | Melton et al. |
| 5,542,066 A | | 7/1996 | Mattson et al. |
| 5,699,552 A | | 12/1997 | Whittaker |
| 5,850,549 A | * | 12/1998 | Blainey et al. ............ 717/156 |
| 6,021,470 A | | 2/2000 | Frank et al. |
| 6,038,642 A | | 3/2000 | Arimilli et al. |
| 6,286,135 B1 | * | 9/2001 | Santhanam ............... 717/146 |
| 6,321,240 B1 | | 11/2001 | Chillimbi et al. |
| 6,330,556 B1 | | 12/2001 | Chillimbi et al. |
| 6,338,119 B1 | | 1/2002 | Anderson et al. |
| 6,360,361 B1 | | 3/2002 | Larus et al. |
| 7,140,008 B2 | * | 11/2006 | Chilimbi et al. ........... 717/158 |
| 7,143,404 B2 | * | 11/2006 | Haghighat et al. ......... 717/159 |
| 7,367,024 B2 | * | 4/2008 | Barua et al. .............. 717/157 |
| 7,555,748 B2 | * | 6/2009 | Archambault et al. ....... 717/158 |
| 2004/0111708 A1 | * | 6/2004 | Calder et al. ............. 717/131 |
| 2005/0044538 A1 | * | 2/2005 | Mantripragada ........... 717/151 |
| 2006/0048103 A1 | * | 3/2006 | Archambault et al. ....... 717/131 |
| 2006/0048117 A1 | * | 3/2006 | Archambault et al. ....... 717/151 |
| 2006/0259691 A1 | * | 11/2006 | Jeremiassen .............. 711/118 |
| 2007/0088915 A1 | * | 4/2007 | Archambault et al. ....... 711/137 |

OTHER PUBLICATIONS

Chen Ding, "Improving Effective Bandwidth through Compiler Enhancement of Global and Dynamic cache Reuse", Jan. 14, 2000, Rice University, Houston, Texas, pp. 1-124.*

Ding, C., "Inter-Array Data Regrouping", Prodeedings, Languages and Compliers to Parallel Computing, 12th International Workshop, 1999, p. 149-63.

(Continued)

*Primary Examiner*—Tuan Q Dam
*Assistant Examiner*—Ben C Wang
(74) *Attorney, Agent, or Firm*—Stephen M. Calogero, Esq.; Steven M. Greenberg, Esq.; Carey, Rodriguez, Greenberg & Paul, LLP (57) ABSTRACT

A compiling program with cache utilization optimizations employs an inter-procedural global analysis of the data access patterns of compile units to be processed. The global analysis determines sufficient information to allow intelligent application of optimization techniques to be employed to enhance the operation and utilization of the available cache systems on target hardware.

27 Claims, 6 Drawing Sheets

OTHER PUBLICATIONS

IBM Technical Disclosure Bulletin, "Implementing Trace-Directed Program Restructuring for Global Data at the Postprocess Level", vol. 37, No. 2B, Feb. 1994, p. 39-40.

Jennifer M. Anderson, Saman P. Amrasinghe and Monica S. Lam, "Data and Computation Transformations for Multiprocessors", Proceedings of Fifth ACM SGPLAN Symposium on Principles and Practice of Parallel Programming (PPoPP '95), Santa Barbara, CA, Jul. 19-21, 1995.

S. Carr, K.S. M.2emcKinley, and C.-W.Tseng."Compiler Optimizations for Improving Data Locality" Proceedings of the Sixth International Conference on Architectural Support for Programming Languages and Operating Systems (ASPLOS-VI), pp. 252-262, San Jose, CA, Oct. 1994.

M. S. Lam, E. E. Rothberg, and M. E. Wolf, "The Cache Performance and Optimizations of Blocked Algorithms", Proceedings of the Fourth International Conference on Architectural Support for Programming Languages and Operating Systems (ASPLOS-IV), pp. 63-74, Santa Clara, CA, Apr. 1991.

O. Temam, E. D. Granston, and W. Jalby, "To Copy or not to Copy; A Compile-Time Technique for Assessing when Data Copying Should be Used to Eliminate Cache Conflicts", Proceedings of Supercomputing '93, pp. 410-419, Portland, OR, Nov. 1993.

M. E. Wolf and M. S. Lam, "A Data Locality Optimizing Algorithm", Proceedings of the SIGPLAN '91 Conference on Programming Language Design and Implementation, pp. 30-44, Toronto, Canada, Jun. 1991.

S-T. Leung and J. Zahorjan, "Optimizing Data Locality by Array Restructuring", Technical Report, Dept. of Computer Science and Engineering, TR 95-09-01, Sep. 1995.

Evelyn Duesterwald, Rajiv Gupta, and Mary Lou Soffa, "A Practical Data Flow Framework for Array Reference Analysis and Its Use in Optimizations", ACM '93 Conf. On Programming Language Design and Implementation, Jun. 1993.

Suleyman Sair, Mark Charney, "Memory Behavior of the SEPC2000 Benchmark Suite", IBM Research Report, RC 21852 (98345) Oct. 6, 2000.

* cited by examiner

COMPILER WITH CACHE UTILIZATION OPTIMIZATIONS

BACKGROUND OF THE INVENTION

The present invention relates to optimizing compilers. More specifically, the present invention relates to compilers and tools for producing optimized code which employs the cache memory system provided in a computer the code is executing on.

A compiler is one tool that is used to convert computer programs written in high level programming languages into the machine code which is executed by the CPU(s) in a computer system. Depending upon how the compiler performs this conversion, the resulting program can execute at different speeds on the computer and/or can require more or less system memory and more or less storage space.

Much work has been done in the past to create compilers which do more than just create a direct translation from source code to machine code. Such compilers are typically referred to as optimizing compilers and they operate to analyze the source code provided to them and to then select and implement appropriate strategies and/or machine code structures that will execute more efficiently on the target computer system than a mere direct translation would.

While optimizing compilers can employ many techniques such as loop transformation and/or data remapping to produce efficient machine code, advances in computer hardware have introduced new challenges to compiler designers. Specifically, the clock speed of CPU devices has undergone an increase in recent years, while system memory speeds have lagged behind. Unmanaged, this speed discrepancy, which is typically referred to as memory latency, causes the CPU to wait idly while data is read from or written to system memory.

To address memory latency, caches may be employed. Caches are relatively small (relative to the size of system memory) banks of memory which can be accessed faster than system memory, but which may be more expensive than system memory and/or which are optimally located within the system architecture for faster access. The intention is that required data will be read into the cache before it is required by the CPU, thus hiding memory latency from the CPU. If a data element required by the CPU is available in the cache, it is referred to as a cache "hit", while if the required data element is not available in the cache, it is said that a cache "miss" has occurred and the CPU must wait while the required data element is retrieved from system memory. Most CPUs now include some amount of cache memory on their chip dies, but the amount of available die area limits the size of the cache that can be placed on-chip. Additional cache memory can be provided in processor assemblies and/or at the system memory subsystems.

Caches are typically arranged in a hierarchy denoted by Levels, with the Level closest to the CPU (usually on the CPU die) being referred to as Level 1 (L1). L1 cache is at the top of the cache hierarchy and Level 2 cache is the next lower level of cache, etc. In the IBM Power4™ system architecture, for example, Level 1 (L1), Level 2 (L2) and Level 3 (L3) caches are provided between the CPU(s) and the system memory.

To manage the memory latency issue, computer designers are employing caching hardware and cache management techniques. The hardware cache managing mechanisms provided in the IBM Power4™ system architecture includes hardware pre-fetch support for the caches. This pre-fetch hardware can recognize up to eight streams of data accessed by an application and will pre-fetch data for those streams to the L1 cache so that the CPU does not have to wait for data required by these streams to be recalled from main memory. A stream, in this sense, is a sequence of stride one memory accesses which are adjacent, or closely located, locations in memory. An example of a stream would be sequential reads from system memory of the sequential elements in a one dimensional array.

Caches have a variety of limitations or conditions that must be considered to utilize them effectively. Data is moved in or out of caches in aligned chunks called cache lines and caches are arranged into a number of cache lines of fixed size. In the above-mentioned IBM Power4™ system, the L1 cache is 32 kB in total size and the cache is arranged in 256 cache lines of 128 bytes each. Data elements which are accessed temporally or spatially 'close' are located within a single cache line, if possible.

Another limitation of cache memories is the possibility for cache conflicts. Caches employ a mapping technique to place a data element stored at a location in a potentially very large system memory into a location in the much smaller cache. A conflict occurs when the mapping technique results in two required data elements being mapped to the same location within the cache. It is possible that multiple data elements in system memory that are required to be cached will be mapped to the same location in the cache. In such a case, a first element cached will be overwritten in the cache by any subsequent element to be cached at that same location and the attempted access to that first element, now overwritten, will result in a cache miss.

In an attempt to reduce the frequency with which such cache conflicts can occur, many caches employ set associativity which essentially provides sets of locations which a system memory location can be mapped to. The above-mention L1 cache in the Power4™ system employs two-way set associativity and thus the probability of a conflict occurring can be halved as the mapper function can place a required data element at a given location in either of the two sets of cache lines to avoid a conflict with a required data element already mapped to that location in the other of the two sets of cache lines. However, such conflicts may still occur and can be problematic if the size and/or arrangement of the elements in an array or other data structure is some multiple of a component of the mapping function such that multiple elements of an array will be mapped to the same location in the cache.

One optimization strategy used in compilers to improve cache utilization is data remapping which is the re-organization and re-arrangement of how data is stored in the system memory. For example, a compiler can arrange the data storage of a two dimensional array of data in system memory so that elements adjacent in array rows are adjacent in the system memory if the array is accessed in row order by the application (typically referred to as row major access). Alternatively, the compiler can arrange the data storage of the two-dimensional array of data in system memory so that elements adjacent in array columns are adjacent in the system memory if the array is accessed in column order (typically referred to as column major access).

SUMMARY OF THE INVENTION

An executable program code produced by a compiler from source code is optimized. A forward pass through all of the compile units of the program to be compiled is performed. The forward pass comprises: building a global call graph representing all of the procedures of the program and their call patterns; defining an array descriptor and determining an approximate live range for each unique array in the procedures of the global call graph; forming a set of equivalent arrays and pointers; determining for each array if the shape of access to the array and shadow access to the array is consistent and discarding from further consideration any array with an inconsistent access shape; creating a loop descriptor for each loop in the remaining arrays and constructing a global loop table and global loop graph from the loop descriptors; and identifying and classifying each stream in the loop and determining the affinity weights between arrays in the loop for each loop in the global loop graph. A backward pass through all of the compile units of the program to be compiled is performed. The backward pass employs the information developed in the forward pass to: construct a global affinity graph indicating each array of interest in the program and its affinity to each other array of interest in the program; and partition the affinity graph to determine and perform beneficial array organization optimizations.

Other aspects and features of the present invention, as defined solely by the claims, will become apparent to those ordinarily skilled in the art upon review of the following non-limited detailed description of the invention in conjunction with the accompanying figures.

DETAILED DESCRIPTION OF THE INVENTION

The present invention will now be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present invention may be written in an object oriented programming language such as Java7, Smalltalk or C++. However, the computer program code for carrying out operations of the present invention may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Cache utilization may be improved to hide or reduce memory latency by data pre-fetching, whether performed by software or hardware, or a combination of both; data remapping so that the resulting memory access patterns make more effective use of the underlying cache system characteristics; and restructuring loops to get unit stride memory access through loop interchange, to increase temporal locality through loop fusion and outer loop unrolling, to exploit data locality through loop blocking and to get contiguous memory access through data copying, loop gathering, etc.

For example, loop transformation operates by modifying the code for loops, especially nested loops, to obtain better performance. As this optimization technique operates on the code for the loops, it is a local transformation in that no other part of the program is necessarily affected by the transformation. In contrast, data remapping operates on data structures and arrangements that are employed, conceivably, across the entire program and thus a remapping of data affects the entire program and is therefore a global transformation.

To date, compilers have employed data remapping in what has effectively been a "best guess" manner when attempting to produce code optimized for computer systems with sophisticated caching systems. A compiler must make assumptions about the usage of an array by a program, for example, when deciding to arrange the array elements for row major access or column major access and the remapping has a global effect on the execution of the program, while the compiler makes its mapping decision based upon an assumption about access patterns to the array elements or based upon local information such as analysis of a single program loop, or set of nested loops.

According to one aspect of the present invention, a global (or interprocedural) analysis of the program being compiled is performed. Optimization techniques are then applied to those portions of the program code or data storage arrangements which, in a global sense, will most benefit the overall execution performance, including cache utilization. In another aspect of the present embodiment of the invention, a two pass global analysis is performed on the entire program being processed by the compiler, the program consisting of one or more compile units.

Figure 1:
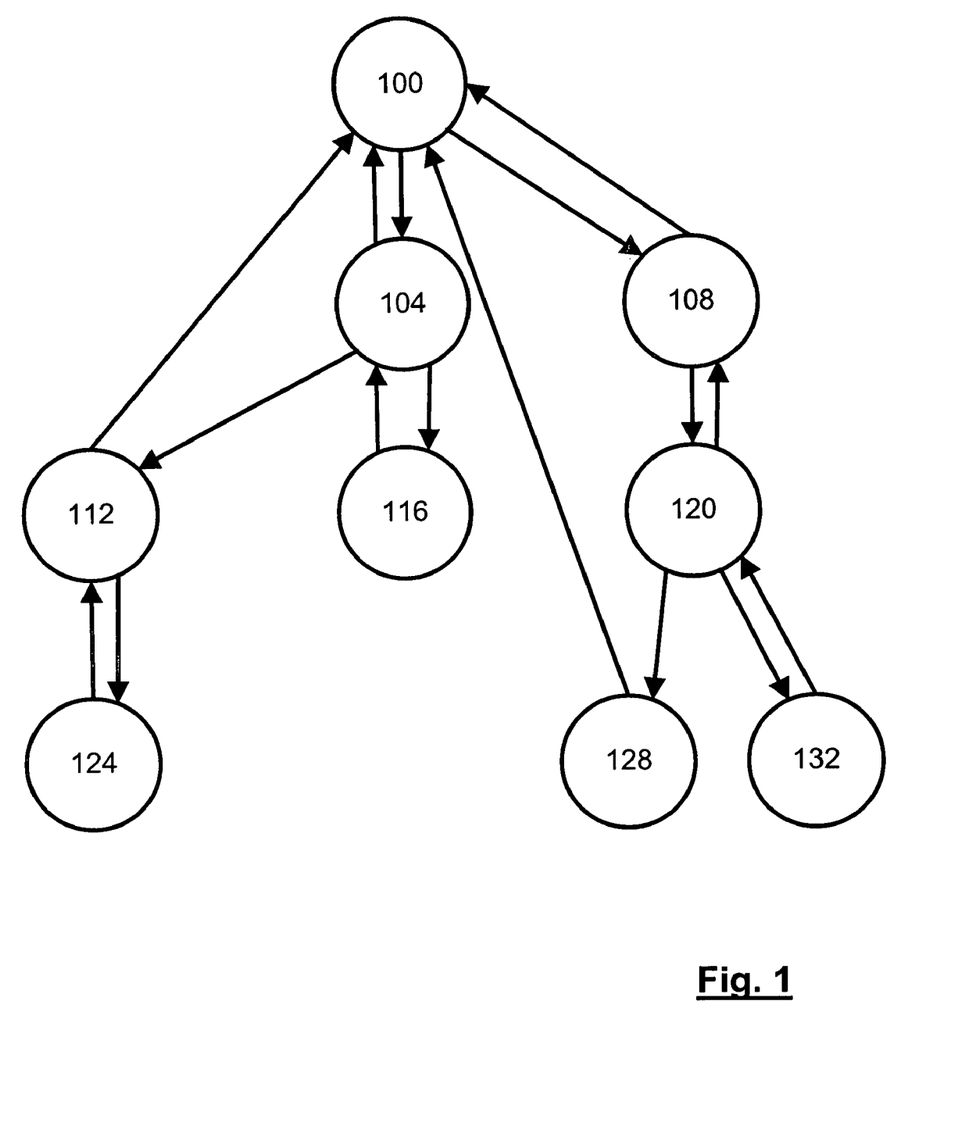
FIG. 1 shows a schematic representation of a call graph for a set of compile units being processed in accordance one aspect of the present invention.

In the first pass, which is a forward pass through the source code of all of the compile units, a global call graph is constructed. The call graph is constructed with a node for each procedure in the compile units and the edges of the graph, which are directed edges, represent calls between the procedures. An example of a call graph is shown in FIG. 1 wherein nodes 100, 104, 108, 112, 116, 120, 124, 128 and 132 represent procedures and the edges, represented by the arrows extending between particular nodes, indicate the control flow through the procedures, i.e.—which procedure calls which other procedure. The call graph is then examined, procedure by procedure, to determine each loop (eg. Lp1, Lp2, Lp3, etc.) in the procedure and the arrays accessed by each loop, as indicated in FIG. 2.

Figure 2:
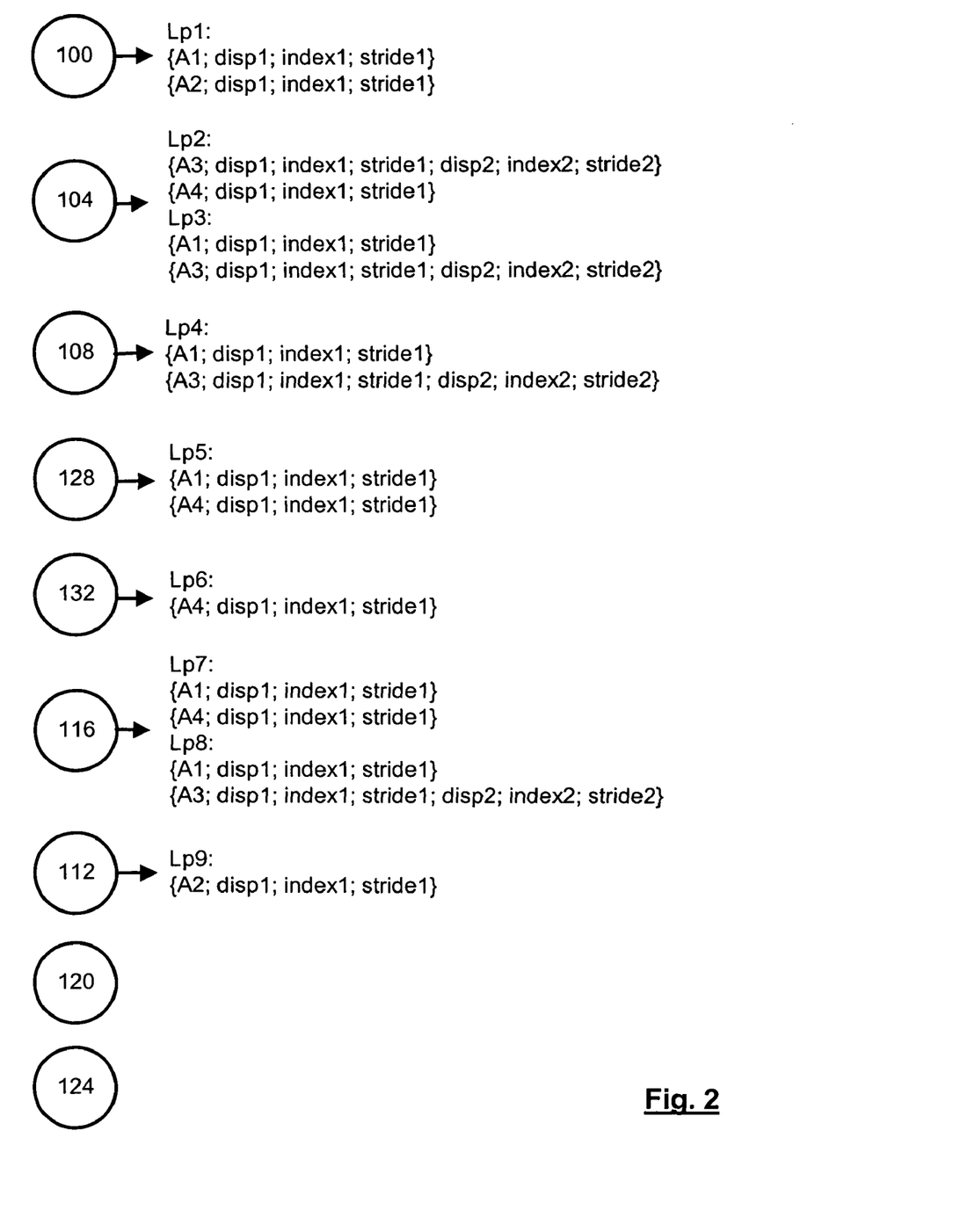
FIG. 2 shows the loop and array information for the call graph of FIG. 1.

The arrays are represented by array descriptors wherein references to the array are converted to a flat canonical subscript form, i.e.—{Array Base-ID, displacement, $index_1$, $stride_1$, ..., $index_m$, $stride_m$}, where m is the number of dimensions of the array, as shown in FIG. 2.

A global array data flow and pointer analysis is then performed to approximate the live range of each array. As is known to those of skill in the art, the live range of an array is the range within the program starting with an assignment to a data element of the array and ending with the last time that assigned value is accessed by the program. As is known to those of skill in the art, determining a precise live range for each array can be computationally expensive and/or impossible. Determining the live ranges in a precise manner is not necessary. Only an approximate set of live ranges need to be determined with a reasonable level of computational expense. These approximate live ranges must, however, be determined conservatively (i.e.—resulting in larger ranges than a precise analysis might otherwise provide). In one aspect of the present invention, these approximate live ranges may be employed, although it will be apparent to those skilled in the art that the determination and use of precise live ranges is not outside the scope of the invention.

Next, the compiler examines the compile units to locate all memory allocation and deallocation operations for dynamic arrays and the compiler performs a trace of all array and/or pointer passing and assignments to form a set of the equivalent arrays and pointers, if any. Finally, the compiler performs a trace of array member access and shadow access for dynamic arrays to determine if the shapes of the access are consistent. For example, an array may be accessed as a two-dimensional array in one part of the program and accessed as a single dimensional array in another part of the program and thus would have an inconsistent access shape. While arrays with such inconsistent access shapes can be considered and further processed, the computational expense of doing so may be unwarranted. However, as will be apparent to those of skill in the art, the further analysis and processing of arrays with inconsistent shapes is not outside the scope of the present invention.

Next, for each loop in the compile units, streams are also identified and classified into load or store streams using known techniques and data dependence and reuse analysis is performed by the compiler. Profile directed feedback, or static branch prediction, is then performed on the loops.

The determined information is combined with the call graph to produce a global loop graph and this global loop graph is examined to determine the affinity weights between each possible pairing of the arrays of the compile units. These affinity weights indicate, for each pair of arrays, how closely the two arrays are related in terms of memory accesses and the affinity weights are stored for each loop in the form of loop id, array symbol-id pair and affinity weight. In other words, for a loop Lp accessing a pair of arrays A and B, the affinity weight W for A and B indicates how often an element in B is accessed with a element in A and this would be stored as {Lp, AB, W}. These determined affinity weights between pairs of arrays are calculated with consideration of the number of streams in a loop performing the access and with consideration of the temporal and spatial data reuse opportunities.

Figure 3:
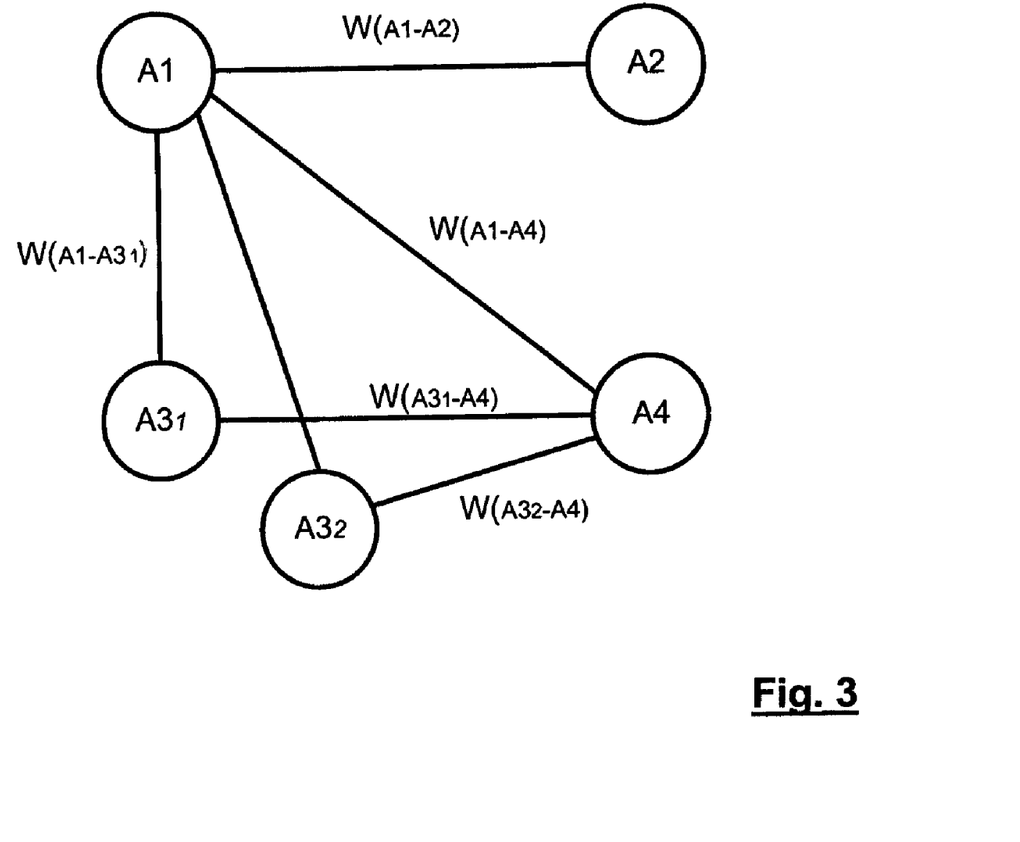
FIG. 3 shows a global affinity graph for the call graph of FIG. 1.

In the second pass, the global loop graph is walked backwards to construct a global affinity graph as shown in FIG. 3. The global affinity graph consists of nodes (vertices) wherein each node is a descriptor of a unique array in the compile unit. As will be apparent to those of skill in the art, analysis is performed using a variety of known techniques to determine the set of unique arrays accessed in a program.

The array descriptors identify the array and the size of its elements. The edges between the array descriptors, in this non-directed graph, indicate the above-determined affinity weights W between the corresponding arrays. When multiple edges exist between any two nodes, the edges are merged into a single edge with the combined affinity weights. The resulting affinity graph provides a global view, for the compile units, of the access patterns and use of the arrays therein and acts as a framework for subsequently performing optimizations.

The affinity graph is then partitioned, using known graph techniques, to meet the appropriate criteria. Formally, for an affinity graph G=(V, E, S, W), V represents the vertices (nodes) of the graph which are all the unique arrays in the compile units being processed and E represents the edges of the graph. S is a function, S:V→I, where I is an integer set, and for each array v∈V, S(v) is the element size of array v. W is a function, W:E→R, where R is a real number set, and for an undirected edge $e_i=(v_i, v_j)$∈E, $W(e_1)$ represents the affinity weights between two vertices $v_i$ and $v_j$.

Given the above, an edge separator ΔE is defined as the set of edges whose removal splits graph G into K pair-wise unconnected sub-graphs ($G_1, G_2, \ldots G_K$). All of these sub-graphs $G_i=(V_i, E_i, S_i, W_1)$ have pairwise disjoint sets of vertices and edges. The edge separator for a particular partitioning including all edges that are not part of a sub-graph, such as $G_i$, is given by $$\Delta E = E - \bigcup_{i=1}^{k} E_i.$$

The partitioning is performed to find an edge separator with a minimum sum of edge weights that partitions G into k disjoint pieces. Formally, this minimum cut objective is given by $$\min_{\Delta E} \sum_{e_i \in \Delta E} W(e_i)$$

with the constraint that for each sub-graph $G_i=(V_i, E_i, S_i, W_i)$, that $$\sum_{v_j \in V_i} S_i(v_j) \le L_s$$

where $L_s$, is the cache line size of the L1 cache.

Once the affinity graph is partitioned, the compiler has the necessary information to perform optimizations which can improve cache utilization. The actual optimizations now performed can vary, depending upon the cache system of the target hardware. Further, while the optimizations discussed herein are known optimizations, the present invention is not limited to using these optimizations and it is contemplated that additional, other and/or future optimizations can be usefully employed with the present invention.

In a present embodiment of the invention, a first specific optimization is performed via a cache conflict analysis. This analysis determines if cache conflicts will occur between streams due to the size of the elements in the streams being such that the function which maps system memory to cache memory will map the elements in the stream to the same cache locations causing conflicts. If necessary, a padding size is determined as a result of this analysis and the storage of such potentially conflicting array elements of the streams is arranged in system memory with spacing of the determined padding size between the elements to avoid such conflicts.

A variety of array data layout transformations can then performed with the knowledge developed as described above. These transformations can include promoting array members, demoting array members, grouping arrays, array field reordering, array dimensioning re-ordering, array splitting and others. If array transformations are performed, the relevant information is recorded by the compiler to guide any necessary subsequent loop transformation.

Array interleaving can be employed to optimize cache pre-fetching. As mentioned above, cache management systems can pre-fetch data for some number of access streams. Analysis is performed by the present invention to determine any loops where more than the maximum number of streams supported by the target hardware cache management system is required. In such identified cases, the present invention will perform array interleaving, if such interleaving will be of benefit to the overall execution of the program, to reduce the required number of streams.

Array interleaving involves finding strongly related (those with high affinity weights) arrays which are then interleaved in system memory to form a single stream when accessed by the program. For example, in the pseudo code fragment:

```
sum=0.0;
for (i=0; i<1000; i++){
```

-continued

```
  j=a[i];
  sum=sum + x[j] * x[j] + y[j] * y[j] + z[j] * z[j];
}
``` there are three arrays in the loop, namely x[ ], y[ ] and z[ ] which are accessed indirectly through array a[ ]. To reduce the number of streams in this loop, the three arrays x[ ], y[ ] and z[ ] can be interleaved to form a single two dimensional array g[l, m] where g[f,1]=x[f] and g[f,2]=y[f] and g[f,3]=z[f] so that it is much more likely that g[a[i],1], g[a[i],2] and g[a[i],3] will reside in the same cache line, thus reducing the number of streams by two, from three to one.

Similarly, array splitting and grouping can be performed where appropriate, as determined from the information recorded by the compiler. For example, given the pseudo code fragment:

```
struct {
  double Q;
  double R;
  double S;
  double V;
  double W;
  double X;
  double Y;
  double Y;
} a[N];
//loop 1
for (i=0; i<N; i++){
  ... = a[i].V ...
  ... = a[i].W ...
  ... = a[i].Z ...;
}
...
//loop2
for (i=0; i<N; i++){
  ... = a[i].Q ...;
  ... = a[i].S ...;
  ... = a[i].X ...;
}
``` where the fields V, W, and Z have high affinity weights as they are used together in loop 1 and where fields Q, S and X have high affinity weights as they are used together in loop 2, then V, W and Z can be grouped, as can Q, S and X, to reduce the number of streams. If the number of streams in the loops is less than the number of streams supported by the cache prefetch mechanisms of the target platform, the groups can be further split. Essentially, array splitting and grouping separates all of the frequently accessed data elements from the less frequently accessed data elements to achieve better cache utilization. For the example above, this code can be restructured to yield:

```
struct{
  double V;
  double W;
  double Z;
} a_V_W_Z[N];
struct{
  double Q;
  double S;
  double X;
} a_Q_S_X[N];
struct{
```

```
        double R;
        double Y;
    } a_R_Y[N];
//loop 1
for (i=0; i<N; i++){
    ... =a_V_W_Z[i].V ...;
    ...
    ... =a_V_W_Z[i].W ...;
    ...
    ... =a_V_W_Z[i].Z ...;
    ...
}
...
//loop 2
for (i=0; i<N; i++){
    ... =a_Q_S_X[i].Q ...;
    ...
    ... =a_Q_S_X[i].S ...;
    ...
    ... =a_Q_S_X[i].X ...;
    ...
}
```

If an array has a structure larger than a cache line, the array can be split into multiple arrays, i.e.—an array of a member fields is promoted to be a separate array. Even if the whole structure of the array can fit into a cache line, array splitting can be used to separate the fields with low affinities from those with high affinities to improve cache utilization.

As mentioned above, array dimension re-ordering can be performed, as can padding of arrays to achieve additional improvements to cache utilization. Any necessary or desired loop transformations can be performed, in accordance with any data remapping which has occurred, to further optimize the final program.

Figure 4A:
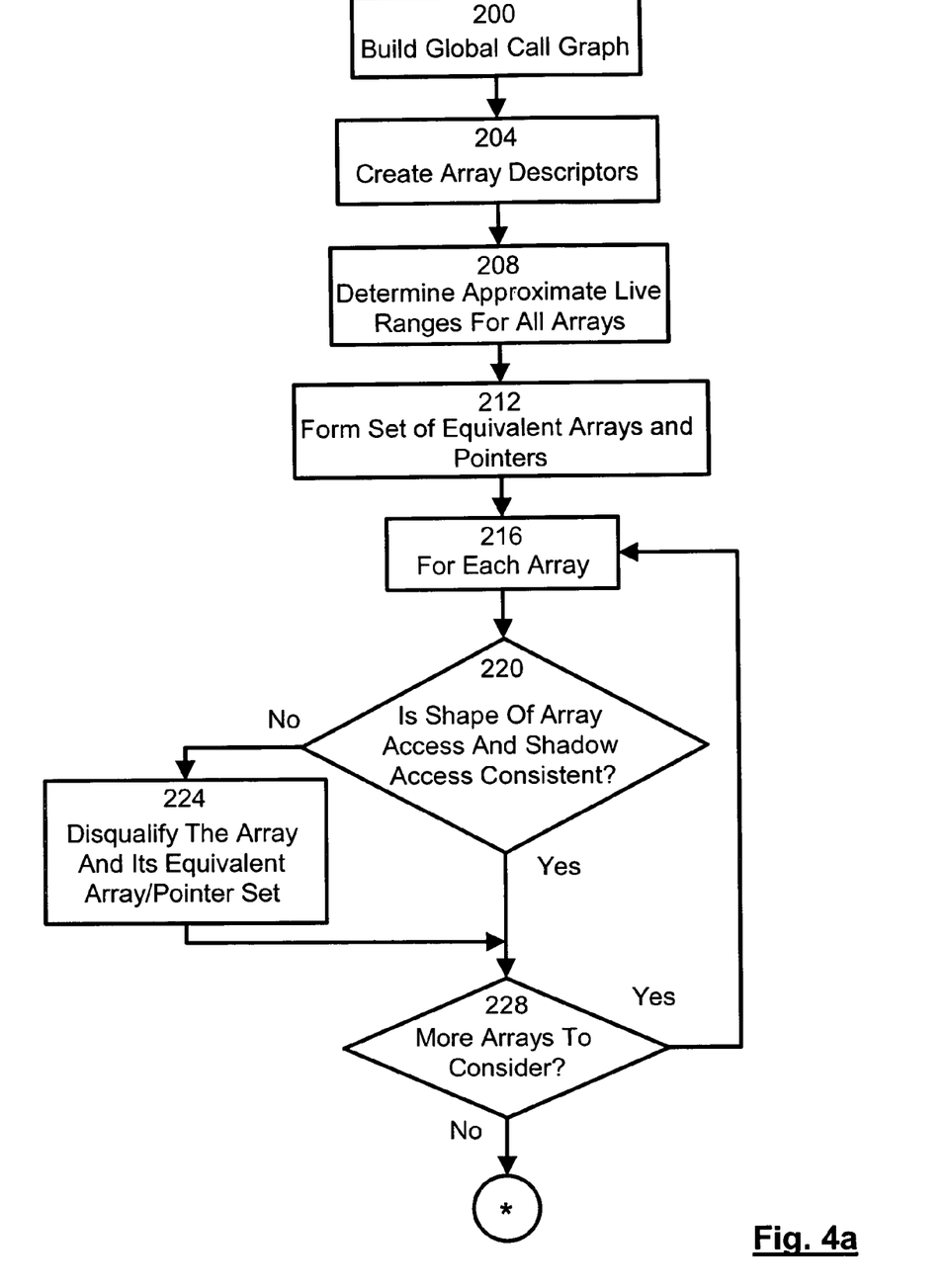
FIGS. 4a and 4b shows a flowchart of the forward pass in accordance with one aspect of the present invention.
Figure 4B:
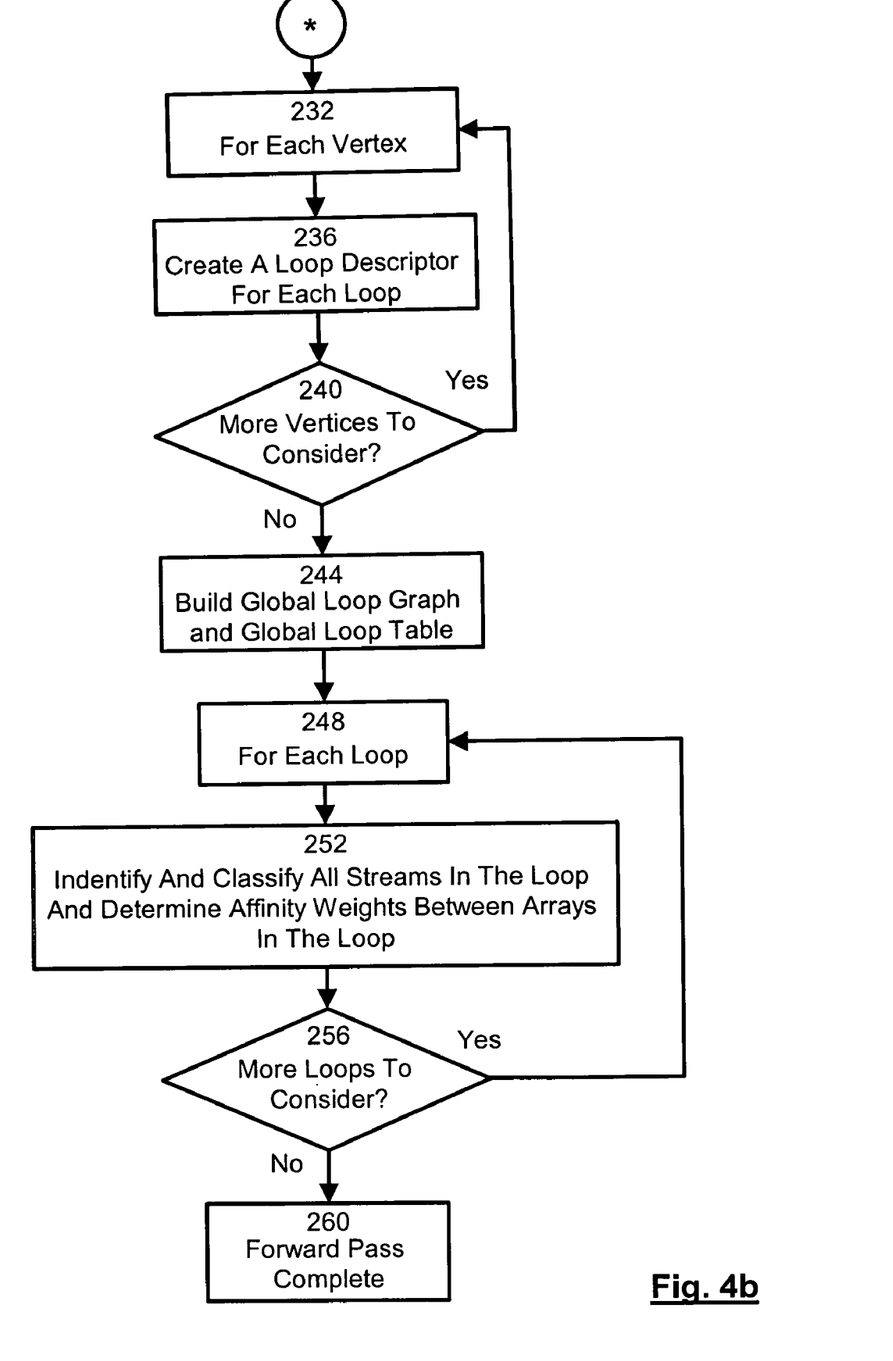

FIGS. 4a and 4b show a flow chart of the forward pass performed in a present embodiment of the invention. The process commences at step 200, wherein all of the compile units are examined by the compiler to construct a global call graph. Each procedure in the compile units is a vertex, or node, in the global call graph and the edges of the graph are directed, indicating the direction of calls between the vertices, and have associated weights indicating the frequency of the calls, as determined from static profiling and, preferably, also from dynamic profiling of the compile units.

At step 204, a descriptor is created for each unique array, static or dynamic, in the compile units under consideration. The descriptors are created by collecting all array references, determining the unique arrays, and placing the unique arrays into canonical subscript form, as described above. For the descriptors for dynamic arrays (those allocated at run time) all unique memory allocation (e.g.—malloc( ) and free( )) information is collected.

At step 208, a global array data flow and pointer analysis is performed on the compile units to determine the approximate live range of the arrays.

Next, at step 212, a set of the equivalent arrays and pointers is formed by the compiler tracing array and/or pointer passing and shadow access and, for dynamic arrays, by the compiler tracing array member access and shadow access.

At step 216, an examination of each array is commenced. Specifically, at step 220 a examination is performed to determine if the shape of access to the array under consideration and the shadow access, if any, to that array are consistent. If the access shape is not consistent, then at step 224 that array is disqualified from further consideration by this embodiment of the present invention. At step 228, if further arrays remain to be considered, the process repeats for the next array until all arrays have been examined.

At step 232, shown in FIG. 4b, processing of each vertex (procedure) in the global call graph is commenced. Specifically, at step 236 a loop descriptor is created for each loop in the procedure. At step 240 if there remain vertices to be considered, the process is repeated.

If no more vertices remain to be considered, then at step 244 a global loop graph, which is used by the compiler to track the relationships between loops inter-procedurally, and a global loop table are constructed.

Next, at step 248 the detailed consideration of each loop in the global loop table is commenced. At step 252, all streams in the loop under consideration are identified and are classified as load or store streams. Further, the affinity weights between each array in the loop are determined and this information is added to the global loop table entry for the loop. The affinity weights are determined based upon data dependence, reuse analysis and static and dynamic profiling information.

If at step 256 there remain more loops to consider, the process repeats. Otherwise, the forward pass analysis completes at 260.

Figure 5:
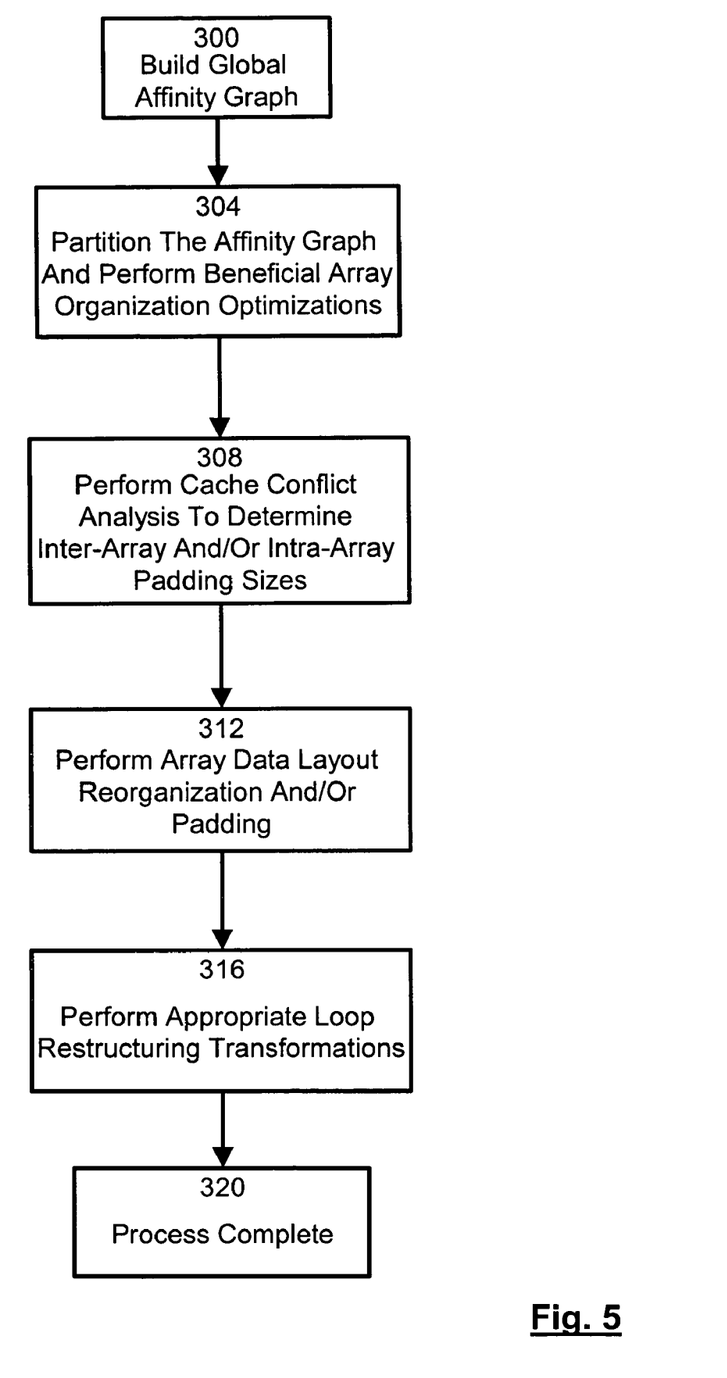
FIG. 5 shows a flowchart of the backward pass in accordance with one aspect of the present invention.

FIG. 5 shows a flowchart of the second, backward pass. This pass commences at step 300 wherein the above-mentioned global affinity graph is constructed from the array descriptors, affinity weights and the other information gathered and determined in the forward pass of FIGS. 4a and 4b.

At step 304, the graph is partitioned to determine if array optimizations, such as array interleaving, splitting and grouping, merging and/or array field reordering can be beneficially performed and the selected optimizations are performed on the arrays which it has been determined will benefit from the optimizations. As mentioned above, the actual array optimizations employed with the present invention are not particularly limited and other optimizations can be employed if appropriate and/or desired.

At step 308, the information from the forward pass is examined, in view of any optimizations performed in step 304, to determine if inter-array and/or intra-array padding should be performed on any arrays to reduce cache conflicts and the size of such padding.

At step 312, the data layout of the arrays can be performed, including any required padding as determined at step 308. Any changes made to the data layout of an array are recorded to guide any subsequent loop transformations in step 316.

Next, at step 316, appropriate loop restructuring transformations, such as loop distribution, loop fusing, etc. and software pre-fetching of data, are performed. As mentioned above with respect to step 312, any changes to the array data layouts made in step 312 are considered when performing these loop transformations. The process of the present invention completes at 320.

The present invention employs a global (inter-procedural) analysis of the data access patterns of compile units to be processed by a compiler to determine sufficient information to allow intelligent application of optimization techniques to be employed to enhance the operation and utilization of the available cache systems on target hardware. In tests of the present invention on systems using the above-mentioned Power4™ architecture, the present invention provided a 5% execution speed improvement overall to the spec2000fp benchmark and well over a 50% execution speed improvement for some user applications.

The above-described embodiments of the invention are intended to be examples of the present invention and alterations and modifications may be effected thereto, by those of skill in the art, without departing from the scope of the invention which is defined solely by the claims appended hereto.

We claim:

1. A method of optimizing executable program code produced by a compiler from source code comprising at least one compile unit for a cache, the method comprising:
   performing a forward pass through all of the compile units of the executable program code to be compiled; and:
   performing a backward pass through all of the compile units of the program to be compiled employing information developed in the forward pass;
   wherein performing a forward pass through all of the compile units of the executable program code to be compiled comprises:
   building a global call graph representing all procedures of the executable program code and their call patterns;
   defining an array descriptor and determining a calculated live range of the array for each unique array in the procedures represented in the global call graph;
   forming a set of equivalent arrays and pointers;
   determining for each array if a shape of access to the array and shadow access to the array is consistent and discarding from further consideration any array with an inconsistent access shape;
   creating a loop descriptor for each loop in the remaining arrays and constructing a global loop table and global loop graph from the loop descriptors; and
   identifying and classifying each stream in the loop and determining affinity weights between arrays in the loop for each loop in the global loop graph.

2. The method of claim 1, wherein performing a backward pass through all of the compile units of the program to be compiled employing information developed in the forward pass comprises:
   constructing a global affinity graph indicating each array of interest in the executable program code and its affinity to each other array of interest in the executable program code; and
   partitioning the affinity graph to determine and perform beneficial array organization optimizations.

3. The method of claim 1 wherein performing a backward pass through all of the compile units of the program to be compiled employing information developed in the forward pass comprises performing a cache conflict analysis to determine inter-array and intra-array padding sizes useful to reduce cache conflicts and reorganizing array data layout to avoid cache conflicts and performing such padding.

4. The method of claim 1 wherein performing a backward pass through all of the compile units of the program to be compiled employing information developed in the forward pass comprises performing loop restructuring transformations.

5. The method of claim 1 wherein performing a backward pass through all of the compile units of the program to be compiled employing information developed in the forward pass comprises performing array interleaving.

6. The method of claim 1 wherein performing a backward pass through all of the compile units of the program to be compiled employing information developed in the forward pass comprises performing array splitting and grouping.

7. The method of claim 1 wherein performing a backward pass through all of the compile units of the program to be compiled employing information developed in the forward pass comprises performing array dimension reordering.

8. The method of claim 1 wherein defining an array descriptor and determining a calculated live range of the array for each unique array in the procedures represented in the global call graph is achieved by performing global array data flow analysis.

9. The method of claim 1 wherein the calculated live range comprises one of an approximate live range and a precise live range.

10. A method of optimizing executable program code produced by a compiler from source code comprising at least one compile unit for a cache, the method comprising:
    performing a forward pass through all of the compile units of the executable program code to be compiled; and:
    performing a backward pass through all of the compile units of the program to be compiled employing information developed in the forward pass;
    wherein performing a backward pass through all of the compile units of the program to be compiled employing information developed in the forward pass comprises:
    constructing a global affinity graph indicating each array of interest in the executable program code and its affinity to each other array of interest in the executable program code; and
    partitioning the affinity graph to determine and perform beneficial array organization optimizations.

11. The method of claim 10 wherein performing a backward pass through all of the compile units of the program to be compiled employing information developed in the forward pass comprises performing a cache conflict analysis to determine inter-array and intra-array padding sizes useful to reduce cache conflicts and reorganizing array data layout to avoid cache conflicts and performing such padding.

12. The method of claim 10 wherein performing a backward pass through all of the compile units of the program to be compiled employing information developed in the forward pass comprises performing loop restructuring transformations.

13. The method of claim 10 wherein performing a backward pass through all of the compile units of the program to be compiled employing information developed in the forward pass comprises performing array interleaving.

14. A method of claim 10 wherein performing a backward pass through all of the compile units of the program to be compiled employing information developed in the forward pass comprises performing array splitting and grouping.

15. The method of claim 10 wherein performing a backward pass through all of the compile units of the program to be compiled employing information developed in the forward pass comprises performing array dimension reordering.

16. A computer program product for optimizing executable program code for utilization of a cache system, the computer program product comprising:
    a computer readable storage medium having computer readable program code embodied therein, the computer readable program code comprising:
    computer readable program code configured to perform a forward pass through all of the compile units of the executable program code to be compiled; and:
    computer readable program code configured to perform a backward pass through all of the compile units of the program to be compiled employing information developed in the forward pass;
    wherein the computer readable program code configured to perform a forward pass through all of the compile units of the executable program code to be compiled comprises:
    computer readable program code configured to build a global call graph representing all procedures of the executable program code and their call patterns;

computer readable program code configured to define an array descriptor and determining a calculated live range of the array for each unique array in the procedures represented in the global call graph;
computer readable program code configured to form a set of equivalent arrays and pointers;
computer readable program code configured to determine for each array if a shape of access to the array and shadow access to the array is consistent and discarding from further consideration any array with an inconsistent access shape;
computer readable program code configured to create a loop descriptor for each loop in the remaining arrays and constructing a global loop table and global loop graph from the loop descriptors; and
computer readable program code configured to identify and classify each stream in the loop and determining affinity weights between arrays in the loop for each loop in the global loop graph.

17. The computer program product of claim 16 wherein the computer readable program code configured to perform a backward pass through all of the compile units of the program to be compiled employing information developed in the forward pass comprises computer reader program code configured to perform a cache conflict analysis to determine inter-array and intra-array padding sizes useful to reduce cache conflicts and reorganizing array data layout to avoid cache conflicts and performing such padding.

18. The computer program product of claim 16 wherein the computer readable program code configured to perform a backward pass through all of the compile units of the program to be compiled employing information developed in the forward pass comprises computer reader program code configured to perform loop restructuring transformations.

19. The computer program product of claim 16 wherein the computer readable program code configured to perform a backward pass through all of the compile units of the program to be compiled employing information developed in the forward pass comprises computer reader program code configured to perform array interleaving.

20. The computer program product of claim 16 wherein the computer readable program code configured to perform a backward pass through all of the compile units of the program to be compiled employing information developed in the forward pass comprises computer reader program code configured to perform array splitting and grouping.

21. The computer program product of claim 16 wherein the computer readable program code configured to perform a backward pass through all of the compile units of the program to be compiled employing information developed in the forward pass comprises computer reader program code configured to perform array dimension reordering.

22. A computer program product for optimizing executable program code for utilization of a cache system, the computer program product comprising:
a computer readable storage medium having computer readable program code embodied therein, the computer readable program code comprising:
computer readable program code configured to perform a forward pass through all of the compile units of the executable program code to be compiled; and:
computer readable program code configured to perform a backward pass through all of the compile units of the program to be compiled employing information developed in the forward pass;
wherein the computer readable program code configured to perform a backward pass through all of the compile units of the program to be compiled employing information developed in the forward pass comprises:
computer readable program code configured to construct a global affinity graph indicating each array of interest in the executable program code and its affinity to each other array of interest in the executable program code; and
computer readable program code configured to partition the affinity graph to determine and perform beneficial array organization optimizations.

23. The computer program product of claim 22 wherein the computer readable program code configured to perform a backward pass through all of the compile units of the program to be compiled employing information developed in the forward pass comprises computer reader program code configured to perform a cache conflict analysis to determine inter-array and intra-array padding sizes useful to reduce cache conflicts and reorganizing array data layout to avoid cache conflicts and performing such padding.

24. The computer program product of claim 22 wherein the computer readable program code configured to perform a backward pass through all of the compile units of the program to be compiled employing information developed in the forward pass comprises computer reader program code configured to perform loop restructuring transformations.

25. The computer program product of claim 22 wherein the computer readable program code configured to perform a backward pass through all of the compile units of the program to be compiled employing information developed in the forward pass comprises computer reader program code configured to perform array interleaving.

26. The computer program product of claim 22 wherein the computer readable program code configured to perform a backward pass through all of the compile units of the program to be compiled employing information developed in the forward pass comprises computer reader program code configured to perform array splitting and grouping.

27. The computer program product of claim 22 wherein the computer readable program code configured to perform a backward pass through all of the compile units of the program to be compiled employing information developed in the forward pass comprises computer reader program code configured to perform array dimension reordering.

* * * * *